United States Patent [19]

Guest

[11] Patent Number: 4,958,858
[45] Date of Patent: Sep. 25, 1990

[54] TUBE COUPLINGS

[76] Inventor: John D. Guest, "Iona" Cannon Hill Way, Bray, Maidenhead, Berkshire, United Kingdom

[21] Appl. No.: 327,309

[22] Filed: Mar. 22, 1989

[30] Foreign Application Priority Data

Mar. 25, 1988 [EP] European Pat. Off. ........ 88302710.4

[51] Int. Cl.⁵ ............................................. F16L 35/00
[52] U.S. Cl. ....................................... 285/24; 285/322; 285/331
[58] Field of Search ................... 285/24, 27, 4, 3, 331, 285/322

[56] References Cited

U.S. PATENT DOCUMENTS 3,466,065  9/1969  Acker et al. ............................ 265/3
4,201,406  5/1980  Dennehey et al. ..................... 285/27

FOREIGN PATENT DOCUMENTS 212883   3/1987  European Pat. Off. .
1520742  8/1978  United Kingdom .
83/03538 10/1983  World Int. Prop. O. ............... 285/3

Primary Examiner—Dave W. Arola
Attorney, Agent, or Firm—Jeffers, Hoffman & Niewyk

[57] ABSTRACT

The disclosures relates to a tube coupling comprising a coupling body (11) having a throughway (12) to receive a tube (15) from one open end to be locked in the coupling body by a collet (18) having resilient fingers (20) engageable with a tapered cam surface (17) adjacent the open end of the body to press the arms against the tube to lock the tube in the coupling body.

The coupling body has an internal integral sleeve (25) extending concentrically along the thoughway to engage in the tube where the tube is engaged by the fingers of the collet. The sleeve has an integral internal cruciform to support the walls of the sleeve against the pressure imposed thereon by the arms of the collet acting through the tube. The end of the cruciform projects from the end of the sleeve adjacent the open end of the coupling body and tapes to an arrow-shaped head (27) to facilitate insertion of the tube over the sleeve into the coupling body.

2 Claims, 1 Drawing Sheet

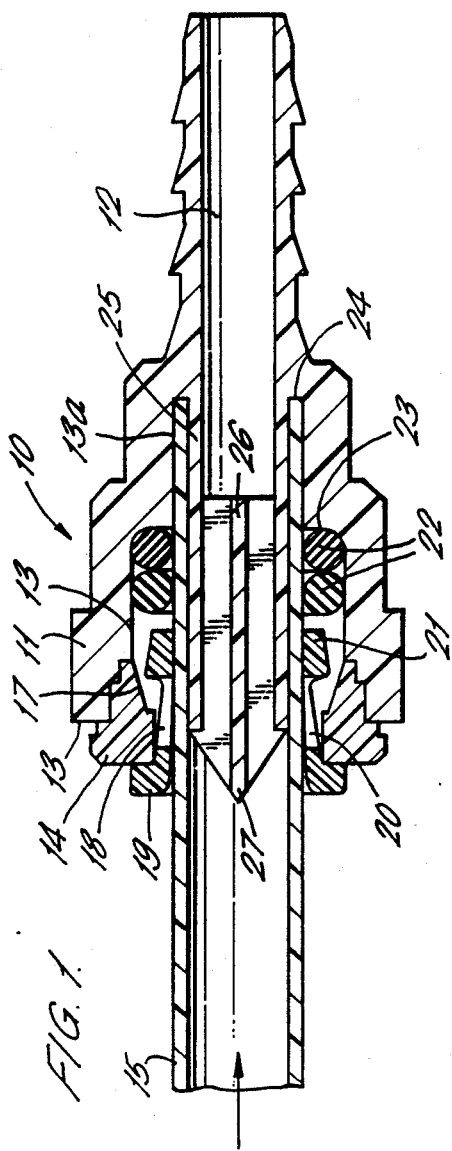
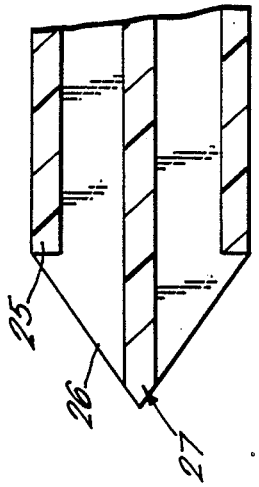
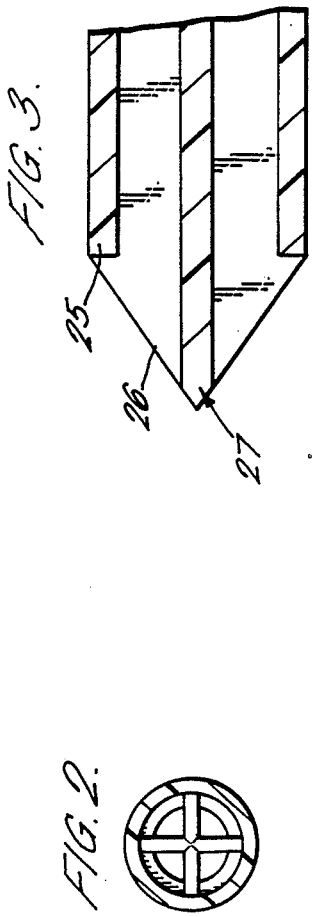

TUBE COUPLINGS

BACKGROUND OF THE INVENTION

1. Field of the Invention

This invention relates to tube couplings. More particularly, the invention relates to tube couplings of the type described in UK Pat. No. 1520742 in which a tube coupling is disclosed having a collet comprising a cylindrical portion with a cylindrical bore and with resilient arms extending axially from one end of said cylindrical portion and arranged to cooperate with a cam surface which is constituted by a member surrounding the collet and having an internal surface tapering to a smaller diameter in one axial direction and engaging the arms so that the arms are forced radially inwardly by axial movement of the collet in said one direction to engage and grip a tube extending into the member through the collet.

2. Background Prior Art

EP-A-No. 0212883 discloses such a tube coupling in which a concentric sleeve is mounted within the throughway with a cruciform support within the sleeve, the sleeve extending through that part of the throughway in which the tapered cam surface is located to support the wall of the sleeve in the region where a load is applied to the sleeve by the resilient arms of the collet engaging and gripping the sleeve. The arrangement of the sleeve within the throughway can render it difficult to insert the sleeve in the throughway and the object of the present invention is to overcome that difficulty.

SUMMARY OF THE INVENTION

The invention provides a tube coupling comprising a body having a throughway open at one end to receive a tube to be secured therein, a sleeve mounted concentrically in the throughway and extending in the throughway towards said one end of the body with a clearance between the sleeve and throughway to receive said tube to be coupled to the body, a collet disposed in said one end of the throughway having plurality of resilient fingers to engage the outer surface of a tube to be located in the body, a cam surface on the body adjacent to and tapering towards said open end to act on the resilient fingers and compress the fingers against the tube and a cruciform extending along the sleeve to support the sleeve where it is engaged by the resilient fingers and projecting from said other end of the sleeve to taper to a point spaced from the end of the sleeve, the tapered end of the cruciform extending to the outer periphery of the sleeve to assist in guiding a tube over the end of the sleeve as it is inserted into the throughway.

BRIEF DESCRIPTION OF THE DRAWINGS

FIG. 1 is a sectional view through a tube coupling according to the invention;

FIG. 2 is a view looking in the direction A on an inner part of the coupling; and FIG. 3 is an enlarged view of the inner part of the coupling shown in FIG. 2.

DESCRIPTION OF THE PREFERRED EMBODIMENTS

Referring firstly to FIG. 1 of the drawings, there is shown a tube coupling comprising a coupling body 11 having a throughway 12 for flow of fluid through the body. The throughway 12 at one end 13 of the body has an encircling insert collar 14 secured therein by ultrasonic welding and a tube 15 to be secured in the coupling extends through the insert into the throughway. The insert 14 has a tapered cam surface 17 reducing towards the open end of the insert and a collet 18 having an annular portion 19 formed with axially extending resilient fingers 20 is located in the insert. The resilient fingers terminate in enlarged heads 21 which have projecting metal teeth on the inner surfaces thereof. When a tube 15 located in the throughway is moved in a direction to extract the tube, the enlarged heads 21 of the collet bear against the tapered cam surface 17 and are forced inwardly to grip and hold the tube to prevent the tube from being released from the throughway. If the collet 18 is held into the insert 14 to disengage the heads 21 from the cam surface, the tube 15 can be withdrawn. Spaced along the throughway 13 from the insert 14, a pair of O-ring seals 22 are provided which lie against an annular shoulder 23 formed in the coupling body 11 and facing towards the open end thereof. The tube 15 is a close fit in the part 13a of the throughway beyond the shoulder 23 and a further annular shoulder 24 is formed spaced along the bore from shoulder 23 to provide an end stop for the end of the tube 15. At the inner periphery of the shoulder 24, the coupling body is formed with an integral sleeve 25 extending concentrically with the throughway towards the open end of the coupling body and terminating within the insert 14. The sleeve 25 is thus encircled by the tube 15 when inserted in the coupling body. The sleeve is formed with an integral internal cruciform 26 to support the wall of the sleeve against the load applied by the heads 21 of the resilient arms 20 in gripping and engaging the tube. The cruciform 26 projects from the open end of the sleeve within the insert and is tapered to a point to form an arrow-shaped end 27. As best seen in FIG. 3, the arms of the cruciform forming the arrow-shaped head 27 taper to the outer diameter of the sleeve 25 and thereby assisting guiding the tube 15 over the end of the sleeve when the tube is inserted in the coupling body.

I claim:

1. A tube coupling comprising a body having a throughway open at one end to receive a tube to be secured therein, a sleeve mounted concentrically out one end thereof in the throughway and extending in the throughway towards said one end of the body with a clearance between the sleeve and throughway to receive said tube to be coupled to the body, a collet disposed in said one end of the throughway having plurality of resilient fingers biased to engage the outer surface of a tube to be located in the body, a cam surface on the body adjacent to and tapering towards said open end to act on the resilient fingers and compress the fingers against the tube and a cruciform extending along and against the invention of the sleeve to support the sleeve where it is engaged by the resilient fingers and projecting from said other end of the sleeve to taper to a point spaced from the end of the sleeve, the tapered end of the cruciform extending to the outer periphery of the sleeve and free to engage an end of a tube to assist in guiding a tube over the end of the sleeve as it is inserted into the throughway.

2. A tube coupling as claimed in claim 1, wherein the sleeve one end is connected integrally to the wall of the throughway at a location spaced from said one end of the body and extends towards said one end concentrically in the throughway with a space between the sleeve and throughway to terminate in said tapered cruciform projecting from the sleeve.

* * * * *